Aug. 19, 1930.  R. C. BENNER  1,773,294
METHOD OF PRODUCING ELEMENTAL SULPHUR
Filed Jan. 21, 1927
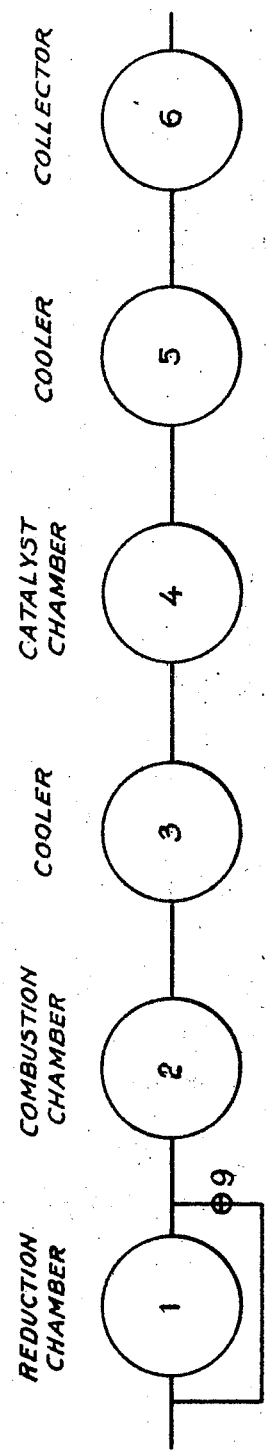
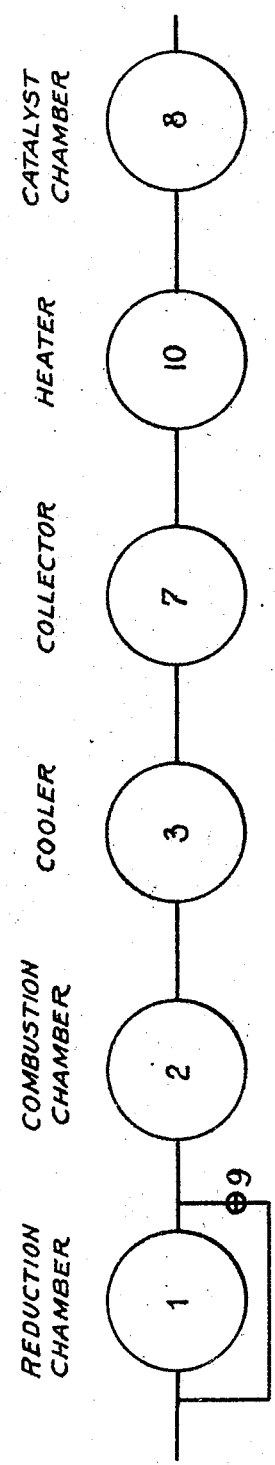
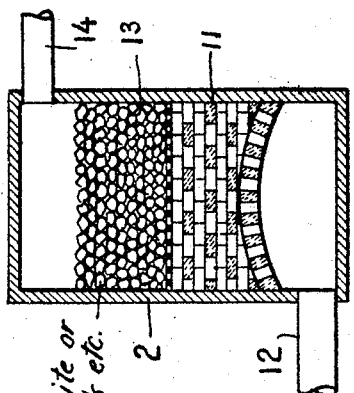
INVENTOR
Raymond C. Benner
BY Forbes Silsby
ATTORNEY Patented Aug. 19, 1930

1,773,294

UNITED STATES PATENT OFFICE

RAYMOND C. BENNER, OF NIAGARA FALLS, NEW YORK, ASSIGNOR TO GENERAL CHEMICAL COMPANY, OF NEW YORK, N. Y., A CORPORATION OF NEW YORK

METHOD OF PRODUCING ELEMENTAL SULPHUR.

Application filed January 21, 1927. Serial No. 162,572.

This invention relates to a method of producing elemental sulphur from gases containing sulphur compounds such as sulphur dioxide, hydrogen sulfide, carbonyl sulfide, etc., and particularly to a method of producing elemental sulphur by the reduction of sulphur dioxide as it occurs in gases from roasting or smelting furnaces or the like by means of solid or liquid carbonaceous fuel.

In the processes heretofore known for the production of elemental sulphur from sulphur dioxide by the reduction of the oxide by carbonaceous fuel, especially solid fuel, great difficulties have been experienced in obtaining a product which is not contaminated with soot or solid carbonaceous particles and which is of such purity that it may be used for the purposes for which brimstone is ordinarily employed. Furthermore, not only does the presence of soot or solid carbonaceous particles contaminate the product but it renders the operation of condensing and collecting the elemental sulphur exceedingly difficult. Mechanical dust collectors have not proven satisfactory as a means for removing the soot and carbonaceous matter and obviously a strong oxidizing atmosphere cannot be employed to burn the soot since such a condition would cause an oxidation of the sulphur. The general procedure, therefore, has been to employ a carbonaceous fuel yielding as little soot as possible and to distill the resulting sulphur product.

It is the object of my invention to provide a process for the rapid reduction of sulphur dioxide either in the pure state or in gas mixtures by means of solid or liquid carbonaceous fuels and the recovery of elemental sulphur therefrom whereby substantially all the sulphur introduced into the system is recovered in the elemental form and the gas leaving the system contains but small amounts of gaseous sulphur compounds which would reduce the efficiency of the process and create a nuisance. It is a further object of my invention to provide a process wherein reducing fuel normally yielding considerable soot and hydrocarbons may be employed and whereby substantially all the soot produced in the reduction of the sulphur dioxide is eliminated from the system and the elemental sulphur produced may be recovered in a substantially pure state suitable for purposes ordinarily requiring brimstone.

Broadly, my invention consists in passing sulphur dioxide gas through incandescent carbonaceous reducing materials, or reducing sulphur dioxide with liquid carbonaceous fuels, adjusting the composition of the resulting gas by the addition of an oxidizing gas such as sulphur dioxide gas to provide approximately reacting proportions of reducing and reducible gases, burning such mixture in a suitable combustion chamber maintained at a temperature of 750-1000° C. or above, and in the presence of a porous refractory material whereby a preferential oxidation of the soot or carbon particles with sulphur dioxide and carbon dioxide is accomplished without oxidation of the elemental sulphur formed, cooling the gas mixture, and subsequently contacting the remaining gaseous products with a suitable catalyst capable of causing the interaction of any remaining reducing and reducible gases to produce elemental sulphur.

In the accompanying drawing Figs. 1 and 2 illustrate diagrammatically two preferred systems for carrying out my novel process. Fig. 1 illustrates a system especially adapted to produce elemental sulphur when the reducing fuel contains little hydrogen either as free hydrogen or as combined hydrogen in the form of hydrocarbons, water vapor, etc., while Fig. 2 illustrates a system especially adapted to produce elemental sulphur when the gaseous products from the reduction contain substantial amounts of hydrogen sulfide. Fig. 3 represents a sectional elevation of the combustion chamber.

The gas containing sulphur dioxide with or without other gaseous sulphur compounds such as may occur in the exit of smelters or as obtained directly by the roasting of sulfide ores is first caused to react with solid or liquid carbonaceous fuels. If the gas contains but a small amount of sulphur dioxide, this sulphur dioxide may be concentrated by any of the well-known methods such as liquefaction and vaporization, absorption in oil, or water, or in solid absorbents such as alumina or dehydrated bauxite, with subsequent liberation by heat, etc. According to my preferred method the sulphur dioxide gas containing for example 7% sulphur dioxide, or concentrated as desired, is introduced into the reduction chamber 1 and passes upwardly through a descending bed of solid carbonaceous fuel which is maintained in an incandescent state. The solid fuel may be either bituminous or anthracite coal, lignite, or coke, etc., my process being especially adapted to utilize cheap carbonaceous fuel high in ash and sulphur and yielding considerable soot and volatile hydrocarbons. The fuel is consumed by the free oxygen present and by the sulphur dioxide forming carbon dioxide and sulphur, the carbon dioxide being subsequently reduced by more carbon to form carbon monoxide. The heat evolved by these reactions serves to drive off the volatile hydrocarbons which are present in the fuel, and these hydrocarbons in the reducing atmosphere break down to yield carbon, in the form of soot, and hydrogen.

The gas mixture leaving the reduction chamber 1 will usually contain considerable amounts of carbon, even as high as 3% of the total carbon introduced into the system, as fine particles in the form of soot. The mixture also contains an excess of reducing gases such as carbon monoxide, hydrogen, hydrocarbons, hydrogen sulfide, etc., as well as a small amount of unreduced sulphur dioxide, some carbonyl sulfide and considerable sulphur vapor. If this soot is permitted to remain in the system, it will seriously interfere with the subsequent catalytic reaction of the reducing gases with additional sulphur dioxide, and with the condensation and collection of the elemental sulphur, and eventually clog the system as well as contaminate the final product. I have discovered that this carbon may be eliminated by preferential oxidation thereof under such conditions that the elemental sulphur present will not be affected but the carbon will be completely consumed.

The hot gas mixture from the reduction chamber, when containing an excess of reducing gases, is mixed with an oxidizing gas, preferably sulphur dioxide containing gas by-passed around the reduction chamber. The amount of such sulphur dioxide will be regulated by the valve 9 so that there will be approximately interacting proportions of reducing gas and reducible gas or a slight excess of reducing gas. The mixing of the gases will preferably be done as soon as possible after the hot gas leaves the reduction chamber and before it cools in order to prevent the formation of additional soot by the decomposition of carbon monoxide according to the equation $$2CO \rightarrow CO_2 + C.$$

When the gas mixture from the reduction chamber already contains approximately interacting proportions of reducing and reducible gases of course no additional sulphur dioxide is introduced. The mixed gases are conducted to a suitable combustion chamber 2 where the interaction of the reducing and reducible gases takes place with the evolution of a large amount of heat. The gases enter the combustion chamber through the inlet 12 and pass upwardly. The chamber is preferably provided with suitable checkerwork 11 with which the gases first contact and which serves to thoroughly mix the gases and aid the combustion, and with porous refractory material 13 positioned above the checkerwork and transversely of the gas stream through which the soot-contaminated gas subsequently "filters". By the term "filter" I do not mean that the refractory material is necessarily of such physical form as to continuously mechanically hold all the solid matter, but rather of such a nature that the solid particles impinging thereon by the baffling effect are momentarily held until such particles are consumed by the sulphur dioxide or carbon dioxide in the gas stream.

Whatever free oxygen is present in the by-passed sulphur dioxide gas is first utilized in burning carbon monoxide to carbon dioxide. The reduction of the sulphur dioxide by the several reducing gases takes place according to the following typical equations:

(1) $2CO + SO_2 \rightarrow 2CO_2 + S$
(2) $CH_4 + 2SO_2 \rightarrow CO_2 + 2H_2O + 2S$
(3) $2H_2 + SO_2 \rightarrow 2H_2O + S$
(4) $2H_2S + SO_2 \rightarrow 2H_2O + 3S$
(5) $C + SO_2 \rightarrow CO_2 + S$ A portion of the soot is therefore burned according to Equation (5), but since the proportion of sulphur dioxide is limited, its concentration becomes small and the reaction is slow and incomplete. I have found, however, that by maintaining the temperature at 750° C. or above, and preferably at about 800–900° C., I am able to completely consume the soot in the presence of suitable refractory catalytic material by preferential oxidation thereof with carbon dioxide, which is normally present in the gas mixture at this point to the extent of about 12–16%. The reaction occurs according to the equation $$CO_2 + C \rightarrow 2CO$$

I have found that the natural mineral bauxite serves excellently as a porous refractory material to catalyze the reaction. Other refractory material may be employed such as aluminum oxide or broken fire brick, etc. In fact, I have found that if the gases are permitted to contact for a sufficiently long time with the incandescent checkerwork of fire brick and at temperatures of about 900–1000° C., the layer of porous refractory material may be omitted. However, I prefer to employ the porous "filtering" material to insure the complete removal of the soot and to permit lower temperatures of operation and a smaller combustion chamber. In normal operation the required temperature is readily maintained by the interaction of the reducing and reducible gases.

In this manner the soot and carbonaceous particles are "filtered" are separated from the gas mixture and are preferentially oxidized by the carbon dioxide while the elemental sulphur remains unoxidized and the gas mixture leaving the combustion chamber through the outlet 14 contains practically no soot or carbonaceous particles which would contaminate the sulphur. The gas mixture from the combustion chamber also contains a small amount of reducing gases such as carbon monoxide, hydrogen sulfide, etc., and a little sulphur dioxide which have not reacted with the reducing gases because of the displacement of the equilibrium of the reaction at the high temperature employed. Accordingly, the gas mixture is cooled by a suitable heat interchange device 3, as for example a suitable type of waste heat boiler, and the gas mixture contacted with a suitable catalyst to complete the interaction of the sulphur dioxide with the reducing gases.

Referring particularly now to Fig. 1, when there is only a small amount of hydrogen sulfide present in the gas mixture from the combustion chamber, which will be the case when little hydrogen is introduced into the system, I prefer to maintain a temperature in the catalyst chamber 4 as low as possible without risking the danger of clogging the catalyst with retained sulphur. For normal operation I have found that a temperature of 280–350° C. is satisfactory. Suitable catalytic materials which may be employed in the chamber are aluminum oxide, ferric oxide, pyrites cinder, titanium oxide, bauxite, calcium sulfate, calcium sulfide, etc. The gases leaving the catalyst chamber 4, containing substantially all the sulphur in the elemental form and free from soot, are conducted to a cooler 5 where they are cooled to 120–150° C., and thence to a sulphur collector 6 where the condensed sulphur is separated out and collected in a substantially pure state.

However, when employing the cheaper reducing fuels, containing substantial amounts of hydrocarbons, such as bituminous coal, lignite, etc., which normally yield considerable soot, and for the utilization of which our process is particularly applicable, the gas mixture from the combustion chamber 2 will contain a considerable amount of hydrogen sulfide produced from the hydrogen present in the system and which has not interacted with the sulphur dioxide present because of the reverse reaction $$3S + 2H_2O \rightarrow 2H_2S + SO_2$$

which occurs readily at the high temperatures and in the presence of sulphur vapor. In order to provide for the complete utilization of this hydrogen sulfide I preferably cool the gas mixture from the combustion chamber to a temperature of about 120–200° C. in the cooler 3. At this temperature a major portion of the elemental sulphur produced in the combustion chamber is condensed and separates out. The gases may then, if desired, be passed through a suitable sulphur collector 7 (Fig. 2) to remove substantially all of the condensed sulphur from the gas stream, or they may be passed directly to the catalyst chamber 8 without such sulphur removal. In either method the gases containing hydrogen sulfide and sulphur dioxide are caused to enter the catalyst chamber 8 at about 120–200° C., and preferably at about 120–150° C. If the gases are normally below this temperature as may be the case when the gas is passed through a sulphur collector, a heater 10 is provided to maintain the requisite temperature. If there is an insufficient amount of oxidizing gas present, i. e. sulphur dioxide, oxygen, or air, to completely oxidize the hydrogen sulfide, more will be added to provide at least interacting proportions. The mixture thus prepared is contacted with a suitable catalyst while maintaining the temperature below that at which sulphur has an appreciable vapor pressure, i. e. below about 200° C. The hydrogen sulfide and sulphur dioxide react completely under these conditions of operation to yield elemental sulphur and water according to the equation $$2H_2S + SO_2 = 2H_2O + 3S.$$

I have found that activated bauxite, as set forth and claimed in the co-pending application of Alfred Paul Thompson and myself, Serial No. 119,739 dated June 30, 1926, is particularly adapted to catalyze the reaction. Such activated bauxite may be prepared by slowly heating the natural mineral bauxite to 400–500° C. and maintaining such temperature for several hours to cause substantial dehydration. The dehydration may be accomplished in vacuo if desired. Other catalysts may be used, however, such as activated carbon, silica gel, tar oils, or salt solutions of the heavy metals. The sulphur produced by the interaction and that present in the gas mixture coming to the catalyst will condense and a major portion run out. When employing activating bauxite, any retained sulphur may be removed at intervals by the application of heat, whenever the activity of the catalyst becomes substantially decreased. The gases leaving the catalyst chamber 8 will be substantially free from all sulphur compounds and may be discharged to the atmosphere.

While I have referred particularly to the use of solid carbonaceous fuels for the reduction of the sulphur dioxide, liquid fuels may also be employed. Various other changes may be made in the manner of applying my invention, and I do not wish to limit the scope thereof except as defined in the appended claims.

I claim:

1. In the process of producing elemental sulphur from sulphur dioxide the steps of reducing sulphur dioxide with carbonaceous fuel to produce a gas mixture containing elemental sulphur, regulating the composition of the gas mixture to provide approximately interacting proportions of reducing and reducible gases and substantial amounts of carbon dioxide, and preferentially oxidizing any solid carbonaceous particles present while avoiding the oxidation of the elemental sulphur.

2. In the process of producing elemental sulphur from sulphur dioxide the steps of contacting a gas mixture from a reducing operation containing elemental sulphur, solid carbonaceous particles, and substantial amounts of carbon dioxide with refractory material while maintaining a temperature of 750° C. or above whereby the solid carbonaceous particles are preferentially oxidized and the elemental sulphur remains unchanged.

3. In the process of producing elemental sulphur from sulphur dioxide the steps of contacting a gas mixture from a reducing operation containing elemental sulphur, solid carbonaceous particles, and substantial amounts of carbon dioxide with bauxite while maintaining a temperature of 750° C. or above whereby the solid carbonaceous particles are preferentially oxidized and the elemental sulphur remains unchanged.

4. In the process of producing elemental sulphur from sulphur dioxide, the steps of contacting sulphur dioxide gas with carbonaceous fuel, adding an oxidizing gas containing sulphur dioxide to provide approximately reacting proportions of reducing and reducible gases, and contacting said mixed gases with refractory material while maintaining a temperature of 750° C. or above, whereby any solid carbonaceous particles in the gas mixture are burned.

5. In the process of producing elemental sulphur from sulphur dioxide, the steps of contacting sulphur dioxide gas with carbonaceous fuel, adding an oxidizing gas containing sulphur dioxide to provide approximately reacting proportions of reducing and reducible gases, the amount of reducing gas being in small excess, and contacting said mixed gases with refractory material while maintaining a temperature of 750° C. or above, whereby any solid carbonaceous particles in the gas mixture are burned.

6. In the process of producing elemental sulphur from sulphur dioxide, the steps of contacting sulphur dioxide gas with carbonaceous fuel, adding an oxidizing gas containing sulphur dioxide to provide approximately reacting proportions of reducing and reducible gases, and contacting said mixed gases with bauxite while maintaining a temperature of 750° C. or above, whereby any solid carbonaceous particles in the gas mixture are burned.

7. In the process of producing elemental sulphur from sulphur dioxide, the steps of contacting sulphur dioxide gas with carbonaceous fuel, adding an oxidizing gas containing sulphur dioxide to provide approximately reacting proportions of reducing and reducible gases, the amount of reducing gas being in small excess, and contacting said mixed gases with bauxite while maintaining a temperature of 750° C. or above, whereby any solid carbonaceous particles in the gas mixture are burned.

8. The process of producing elemental sulphur which comprises the steps of contacting sulphur dioxide with incandescent carbonaceous fuel, regulating the composition of the gaseous product to provide approximately reacting proportions of reducing and reducible gases, maintaining the temperature sufficiently high to burn any solid carbonaceous matter present with sulphur dioxide or carbon dioxide, cooling said gas mixture, contacting said gas mixture with a suitable catalyst to aid the interaction of the reducing and reducible gases and recovering the elemental sulphur produced.

9. The process of producing elemental sulphur which comprises the steps of contacting sulphur dioxide with incandescent carbonaceous fuel, regulating the composition of the gaseous product to provide approximately reacting proportions of reducing and reducible gases, contacting the resulting gas mixture with refractory material while maintaining a temperature of 750° C. or above, whereby any solid carbonaceous matter present will be burned, cooling said gas mixture, contacting said gas mixture with a suitable catalyst to aid the interaction of the reducing and reducible gases and collecting the elemental sulphur.

10 The process of producing elemental sulphur which comprises the steps of contacting sulphur dioxide with incandescent carbonaceous fuel, adding sulphur dioxide to the gaseous product to provide approximately reacting proportions of reducing and reducible gases, said reducing gas being in slight excess, contacting the resulting gas mixture with bauxite while maintaining a temperature of 750° C. or above, whereby any solid carbonaceous matter present will be burned, cooling said gas mixture, contacting said gas mixture with a suitable catalyst to aid the interaction of the reducing and reducible gases and collecting the elemental sulphur.

11. The process of producing elemental sulphur which comprises the steps of contacting sulphur dioxide with carbonaceous fuel, regulating the composition of the resulting gas mixture to provide approximately interacting proportions of reducing and reducible gases and substantial amounts of carbon dioxide, preferentially oxidizing any solid carbonaceous particles present while avoiding the oxidation of the elemental sulphur, cooling the resulting gas mixture to condense and separate out the elemental sulphur, and contacting the remaining gas with a catalyst capable of causing the interaction of hydrogen sulfide and an oxidizing gas at a temperature below that at which sulphur has an appreciable vapor pressure.

12. The process of producing elemental sulphur which comprises the steps of contacting sulphur dioxide with carbonaceous fuel, regulating the composition of the resulting gas mixture to provide approximately interacting proportions of reducing and reducible gases and substantial amounts of carbon dioxide, preferentially oxidizing any solid carbonaceous particles present while avoiding the oxidation of the elemental sulphur, cooling the resulting gas mixture to condense and separate out the elemental sulphur, and contacting the remaining gas with activated bauxite below 200° C.

13. The process of producing elemental sulphur which comprises the steps of contacting sulphur dioxide with incandescent carbonaceous fuel, regulating the composition of the gaseous product to provide approximately interacting proportions of reducing and reducible gases, contacting the resulting gas mixture with refractory material while maintaining a temperature of 750° C. or above, whereby any solid carbonaceous matter present will be burned, cooling said gas mixture to condense the elemental sulphur, contacting the remaining gas with a suitable catalyst capable of causing the interaction of hydrogen sulfide and an oxidizing gas below 200° C., and collecting the elemental sulphur.

14. The process of producing elemental sulphur which comprises the steps of contacting sulphur dioxide with incandescent carbonaceous fuel, adding sulphur dioxide to the gaseous product to provide approximately interacting proportions of reducing and reducible gases, contacting the resulting gas mixture with bauxite while maintaining a temperature of 750° C. or above, whereby any solid carbonaceous matter present will be burned, cooling said gas mixture to condense the elemental sulphur, contacting the remaining gas with activated bauxite below 200° C., and collecting the elemental sulphur.

15. In the process of producing elemental sulphur from sulphur dioxide, the steps of contacting sulphur dioxide gas with carbonaceous fuel to produce a gas mixture containing elemental sulphur, solid carbonaceous particles, carbon monoxide, and carbon dioxide, adding an oxidizing gas containing sulphur dioxide to the gaseous products of the first mentioned step before any substantial cooling of the said gaseous products has taken place whereby the formation of soot by decomposition of carbon monoxide is avoided, and then contacting the gas with refractory material while maintaining a temperature of 750° C. or above whereby the solid carbonaceous particles are preferentially oxidized and the elemental sulphur remains unchanged.

16. In the process of producing elemental sulphur from sulphur dioxide, the steps of contacting sulphur dioxide gas with carbonaceous fuel under conditions as to produce a gas mixture containing elemental sulphur in comparatively large, recoverable quantities, carbon monoxide, and a comparatively small amount of carbonyl sulfide, and then adding an oxidizing gas containing sulphur dioxide to the gas mixture of the first mentioned step before any substantial cooling of the said gas mixture has taken place, whereby the formation of soot by decomposition of carbon monoxide is avoided.

In testimony whereof, I affix my signature.

RAYMOND C. BENNER.